US010029427B2

(12) United States Patent
Schmidt et al.

(10) Patent No.: US 10,029,427 B2
(45) Date of Patent: Jul. 24, 2018

(54) PROCESS FOR THE PRODUCTION OF STORAGE-STABLE POLYURETHANE PREPREGS AND MOULDINGS PRODUCED THEREFROM FROM DISSOLVED POLYURETHANE COMPOSITION

(75) Inventors: Friedrich Georg Schmidt, Haltern am See (DE); Rainer Lomoelder, Muenster (DE); Martina Ortelt, Duelmen (DE); Britta Kohlstruk, Duelmen (DE); Emmanouil Spyrou, Schermbeck (DE); Holger Loesch, Herne (DE); Dirk Fuchsmann, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 561 days.

(21) Appl. No.: 13/825,728

(22) PCT Filed: May 30, 2011

(86) PCT No.: PCT/EP2011/058805
§ 371 (c)(1),
(2), (4) Date: Mar. 22, 2013

(87) PCT Pub. No.: WO2012/038105
PCT Pub. Date: Mar. 29, 2012

(65) Prior Publication Data
US 2013/0303042 A1   Nov. 14, 2013

(30) Foreign Application Priority Data
Sep. 23, 2010 (DE) .................. 10 2010 041 247

(51) Int. Cl.
| B29C 70/54 | (2006.01) |
| B29C 70/50 | (2006.01) |
| B29C 70/52 | (2006.01) |
| C08G 18/42 | (2006.01) |
| C08G 18/79 | (2006.01) |
| C08J 5/24 | (2006.01) |
| D06N 3/14 | (2006.01) |
| B32B 27/04 | (2006.01) |
| B29K 75/00 | (2006.01) |

(52) U.S. Cl.
CPC ............. B29C 70/54 (2013.01); B29C 70/50 (2013.01); B29C 70/52 (2013.01); C08G 18/42 (2013.01); C08G 18/798 (2013.01); C08J 5/24 (2013.01); D06N 3/147 (2013.01); B29K 2075/00 (2013.01); C08J 2375/06 (2013.01); Y10T 442/20 (2015.04)

(58) Field of Classification Search
CPC .................................................. B29C 70/54
USPC ............................................. 264/257, 259
See application file for complete search history.

(56) References Cited

U.S. PATENT DOCUMENTS

| 3,793,238 A * | 2/1974 | Winkelmann | ........ C08G 18/798 264/216 |
| 3,936,575 A | 2/1976 | Watanabe et al. | |
| 3,998,794 A * | 12/1976 | Muller | ........... C08G 18/10 521/161 |
| 4,248,935 A * | 2/1981 | Temple | ........... C03C 25/26 428/391 |
| 4,251,428 A * | 2/1981 | Recker | ........... C08G 18/12 524/450 |
| 4,400,497 A * | 8/1983 | Blum | ........... C08G 18/08 427/388.1 |
| 4,401,499 A * | 8/1983 | Kaneko | ........... C08G 18/58 156/307.1 |
| 4,403,064 A | 9/1983 | Heine | |
| 5,308,679 A * | 5/1994 | Saito et al. | ........... 428/193 |
| 5,439,863 A | 8/1995 | Bottcher et al. | |
| 6,342,551 B1 * | 1/2002 | Jolley | ........... C09D 5/034 524/210 |
| 6,468,643 B1 | 10/2002 | Kanbayashi et al. | |
| 6,495,650 B2 | 12/2002 | Kohlstruk et al. | |
| 6,613,863 B2 | 9/2003 | Kohlstruk et al. | |
| 6,703,471 B2 | 3/2004 | Kohlstruk et al. | |
| 6,747,070 B2 | 6/2004 | Wenning et al. | |
| 6,825,240 B2 | 11/2004 | Wenning et al. | |
| 6,861,465 B2 | 3/2005 | Wenning et al. | |
| 6,914,115 B2 | 7/2005 | Spyrou et al. | |
| 6,924,385 B2 | 8/2005 | Lettmann et al. | |
| 6,960,620 B2 | 11/2005 | Wenning et al. | |
| 7,001,973 B2 | 2/2006 | Kohlstruk et al. | |
| 7,307,135 B2 | 12/2007 | Spyrou | |
| 7,687,554 B2 * | 3/2010 | Schellenberg | ........... C08F 2/44 523/223 |
| 7,767,778 B2 * | 8/2010 | Rawlins | ........... C08G 18/42 528/272 |
| 7,919,552 B2 * | 4/2011 | Grahl | ........... C08G 18/2825 524/385 |
| 8,222,312 B2 | 7/2012 | Spyrou et al. | |
| 8,455,090 B2 * | 6/2013 | Schmidt | ........... C08G 18/0895 428/292.1 |
| 8,476,376 B2 | 7/2013 | Grenda et al. | |
| 8,524,837 B2 | 9/2013 | Grenda et al. | |
| 8,569,440 B2 | 10/2013 | Spyrou et al. | |

(Continued)

FOREIGN PATENT DOCUMENTS

| CN | 102361902 A | 2/2012 |
| CN | 102361917 A | 2/2012 |

(Continued)

OTHER PUBLICATIONS

Combined Office Action and Search Report dated Oct. 30, 2013 in Chinese Patent Application No. 201180026242.2 (English translation only).

(Continued)

Primary Examiner — Atul P. Khare
(74) Attorney, Agent, or Firm — Oblon, McClelland, Maier & Neustadt, L.L.P.

(57) ABSTRACT

The invention relates to a method for producing storage-stable polyurethane prepregs and molding bodies produced therefrom (composite components), which can be obtained by a method using a polyurethane composition in solution and by impregnation of fiber-reinforced materials such as of woven fabrics and laid scrim using reactive polyurethane compositions.

16 Claims, 1 Drawing Sheet

(56) References Cited

U.S. PATENT DOCUMENTS

| | | |
|---|---|---|
| 8,674,050 B2 | 3/2014 | Spyrou |
| 8,702,899 B2 | 4/2014 | Spyrou et al. |
| 8,816,125 B2 | 8/2014 | Michalczak et al. |
| 8,829,146 B2 | 9/2014 | Spyrou |
| 2004/0077801 A1 | 4/2004 | Feola et al. |
| 2005/0222364 A1* | 10/2005 | Rawlins ............... C08G 18/42 528/45 |
| 2005/0239956 A1 | 10/2005 | Spyrou et al. |
| 2005/0239992 A1 | 10/2005 | Spyrou et al. |
| 2007/0266897 A1 | 11/2007 | Spyrou |
| 2007/0282089 A1 | 12/2007 | Spyrou |
| 2008/0139753 A1 | 6/2008 | Spyrou et al. |
| 2008/0171816 A1 | 7/2008 | Spyrou et al. |
| 2008/0214728 A1 | 9/2008 | Spyrou et al. |
| 2008/0265201 A1 | 10/2008 | Spyrou et al. |
| 2008/0269415 A1 | 10/2008 | Spyrou et al. |
| 2009/0018262 A1* | 1/2009 | Licht ............... C08G 18/0861 524/591 |
| 2010/0168329 A1* | 7/2010 | Hoppe ............... C07C 263/18 524/871 |
| 2010/0179273 A1 | 7/2010 | Spyrou et al. |
| 2010/0179282 A1 | 7/2010 | Spyrou |
| 2010/0222540 A1 | 9/2010 | Raukamp et al. |
| 2010/0227942 A1 | 9/2010 | Spyrou et al. |
| 2010/0263792 A1* | 10/2010 | Spyrou ............... C08G 18/168 156/331.4 |
| 2011/0039030 A1* | 2/2011 | Spyrou ............... C08G 18/1875 427/389 |
| 2012/0003890 A1 | 1/2012 | Schmidt et al. |
| 2012/0003891 A1 | 1/2012 | Schmidt et al. |
| 2012/0071577 A1 | 3/2012 | Pfeffer et al. |
| 2012/0073472 A1 | 3/2012 | Spyrou et al. |
| 2012/0077932 A1 | 3/2012 | Pfeffer et al. |
| 2013/0041102 A1 | 2/2013 | Albrecht et al. |
| 2013/0041103 A1 | 2/2013 | Grenda et al. |
| 2013/0045652 A1 | 2/2013 | Schmidt et al. |
| 2013/0078417 A1 | 3/2013 | Schmidt |
| 2013/0243962 A1 | 9/2013 | Lomoelder et al. |
| 2013/0244043 A1 | 9/2013 | Lomoelder et al. |
| 2014/0065911 A1 | 3/2014 | Schmidt et al. |
| 2014/0087613 A1 | 3/2014 | Spyrou et al. |
| 2014/0316056 A1 | 10/2014 | Grenda et al. |

FOREIGN PATENT DOCUMENTS

| | | | |
|---|---|---|---|
| DE | 968566 C * | 3/1958 | ............ C08G 18/12 |
| DE | 2 164 381 | 6/1973 | |
| DE | 24 07 923 | 9/1974 | |
| DE | 24 30 426 | 1/1975 | |
| DE | 30 00 940 A1 | 7/1980 | |
| DE | 31 48 358 A1 | 9/1982 | |
| DE | 102007057057 A1 * | 5/2009 | ............ C08G 18/1875 |
| DE | 102008007386 A1 * | 8/2009 | ............ C08G 18/168 |
| EP | 0 111 122 | 6/1984 | |
| EP | 0 578 974 | 1/1994 | |
| EP | 0 589 167 | 3/1994 | |
| EP | 0 669 353 A1 | 8/1995 | |
| EP | 1 097 804 A1 | 5/2001 | |
| EP | 1 413 612 A1 | 4/2004 | |
| FR | 2 544 322 | 10/1984 | |
| GB | 1411958 | 10/1975 | |
| GB | 2 093 035 | 8/1982 | |
| JP | 55-157620 A | 12/1980 | |
| JP | 11 60677 | 3/1999 | |
| JP | 2004-107812 A | 4/2004 | |
| JP | 2008-248240 A | 10/2008 | |
| JP | 2010 6900 | 1/2010 | |
| WO | WO 2007/064688 A2 | 6/2007 | |
| WO | WO 2007/064688 A3 | 6/2007 | |
| WO | WO 2009156282 A1 * | 12/2009 | ......... C08G 18/1875 |
| WO | 2010 108701 | 9/2010 | |
| WO | 2010 108723 | 9/2010 | |
| WO | WO 2011/147688 A1 | 12/2011 | |
| WO | WO 2011/157507 A1 | 12/2011 | |
| WO | WO 2012/038200 A1 | 3/2012 | |
| WO | WO 2012/038201 A1 | 3/2012 | |
| WO | WO 2012/038203 A1 | 3/2012 | |
| WO | WO 2012/093006 A1 | 7/2012 | |

OTHER PUBLICATIONS

International Search Report dated Sep. 13, 2011 in PCT/EP11/57658 Filed May 12, 2011.
International Search Report dated Jun. 11, 2012 in PCT/EP2012/054938.
International Search Report dated Dec. 23, 2011 in PCT/EP11/64895 Filed Aug. 30, 2011.
International Search Report dated Dec. 19, 2011 in PCT/EP11/64942 Filed Aug. 31, 2011.
International Search Report dated Dec. 19, 2011 in PCT/EP11/64905 Filed Aug. 30, 2011.
Li Shaoxiong, et al., Polyurethane Adhesives, 1st edition, Chemical Industry Press, Aug. 31, 1998, pp. 207-208 (with partial English translation).
U.S. Appl. No. 14/433,186, filed Apr. 2, 2015, Spyrou et al.
U.S. Appl. No. 14/431,085, filed Mar. 25, 2015, Spyrou et al.
U.S. Appl. No. 14/685,162, filed Apr. 13, 2015, Spyrou, et al.
U.S. Appl. No. 14/774,395, filed Sep. 10, 2015, Spyrou, et al.
U.S. Appl. No. 13/978,059, filed Aug. 21, 2013, Schmitt, et al.
U.S. Appl. No. 14/007,585, filed Sep. 25, 2013, Spyrou, et al.
U.S. Appl. No. 13/824,084, filed Mar. 15, 2013, Schmidt, et al.
U.S. Appl. No. 13/824,035, filed Mar. 15, 2013, Schmidt, et al.
U.S. Appl. No. 13/824,064, filed Mar. 15, 2013, Schmidt, et al.
International Search Report dated Sep. 5, 2011 in PCT/EP11/58805 Filed May 30, 2011.
U.S. Appl. No. 14/409,583, filed Dec. 19, 2014, Lomoelder, et al.

* cited by examiner

PROCESS FOR THE PRODUCTION OF STORAGE-STABLE POLYURETHANE PREPREGS AND MOULDINGS PRODUCED THEREFROM FROM DISSOLVED POLYURETHANE COMPOSITION

The invention relates to a process for the production of storage-stable polyurethane prepregs and mouldings produced therefrom (composite components), obtainable by a process using a dissolved polyurethane composition by impregnation of fibre reinforced materials such as fabrics and non-wovens with the use of reactive polyurethane compositions.

Various moulding processes, such as for example the reaction transfer moulding (RTM) process, comprise the introduction of the reinforcing fibres into a mould, the closing of the mould, the introduction of the crosslinkable resin formulation into the mould and the subsequent crosslinking of the resin, typically by application of heat.

One of the limitations of such a process is relative difficulty of laying the reinforcing fibres in the mould. The individual layers of the fabric or non-woven must be cut to size and adapted to a great variety of mould geometries. This can be both time-intensive and also complicated, in particular when the moulding is also intended to contain foam or other cores. Mouldable fibre reinforcements with simple handling and pre-existing reshaping possibilities would be desirable here.

Fibre reinforced materials in the form of prepregs are already used in many industrial applications because of their ease of handling and the increased efficiency during processing in comparison to the alternative wet lay-up technology.

Industrial users of such systems, as well as faster cycle times and higher storage stabilities even at room temperature, also demand the possibility of cutting the prepregs to size, without the cutting tools becoming contaminated with the often sticky matrix material during automated cutting to size and lay-up of the individual prepreg layers.

As well as polyesters, vinyl esters and epoxy systems, there are a range of specialized resins in the field of the crosslinking matrix systems. These also include polyurethane resins, which because of their toughness, damage tolerance and strength are used in particular for the production of composite profiles by pultrusion processes. The toxicity of the isocyanates used is often mentioned as a disadvantage.

Polyurethane composites also exhibit superior toughness compared to vinyl esters, unsaturated polyester resins (UPR) or UPR-urethane hybrid resins.

Prepregs and composites produced therefrom on the basis of epoxy systems are for example described in WO 98/50211, U.S. Pat. Nos. 4,992,228, 5,080,857, 5,427,725, GB 2007676, GB 2182074, EP 309 221, EP 297 674, WO 89/04335, U.S. Pat. Nos. 5,532,296 and 4,377,657, 4,757,120.

In WO 2006/043019, a process for the production of prepregs on the basis of epoxy resin polyurethane powders is described.

Furthermore, prepregs based on thermoplastics in powder form as the matrix are known.

In US 2004/0231598, a method is described wherein the particles are passed through a special acceleration chamber with electrostatic charging. This device is used for the coating of glass, aramid or carbon fibre substrates for the production of prepregs from thermoplastic resins. As resins, polyethylene (PE), polypropylene (PP), polyether ether ketone (PEEK), polyether sulphone (PES), polyphenyl sulphone (PPS), polyimide (PI), polyamide (PA), polycarbonate (PC), polyethylene terephthalate (PET), polyurethane (PU), polyester and fluoro polymers are mentioned. The thermoplastic prepreg textiles produced therefrom exhibit inherent toughness, good viscoelastic damping behaviour, unlimited storage life, and good chemicals resistance and recyclability.

In WO 98/31535, a method for powder impregnation is described, wherein the glass or carbon fibre strands to be impregnated are impacted with a particle/liquid or particle/gas mixture in a defined velocity profile. In this, the powders consist of ceramic or thermoplastic materials, inter alia thermoplastic polyurethane.

In WO 99/64216, prepregs and composites and a method for the production thereof are described, wherein emulsions with polymer particles so small that individual fibre coating is enabled are used. The polymers of the particles have a viscosity of at least 5000 centipoises and are either thermoplastics or crosslinking polyurethane polymers.

In EP 0590702, powder impregnations for the production of prepregs are described, wherein the powder consists of a mixture of a thermoplastic and a reactive monomer or prepolymers. WO 2005/091715 likewise describes the use of thermoplastics for the production of prepregs.

Michaeli et al. describe the development of a powder technology for a pultrusion process with thermoplastic polyurethanes, referred to as TPU, in Coatings & Composite Materials, No. 19, p 37-39, 1997. Further, in the article Processing and properties of thermoplastic polyurethane prepreg. (Ma, C. C. M.; Chiang, C. L. Annual Technical Conference—Society of Plastics Engineers (1991), 49th 2065-9.) thermoplastic polyurethane (TPU) prepregs based on TPU systems containing solvents and water are disclosed.

Prepregs with a matrix based on 2-component polyurethanes (2-C PUR) are known. The category of the 2-C PUR essentially comprises the standard reactive polyurethane resin systems. In principle, this is a system made up of two separate components. While the critical ingredient of one component is always a polyisocyanate, in the case of the second this is polyols, or with recent developments also amino- or amine-polyol mixtures. The two parts are only mixed together shortly before processing. Thereafter the chemical curing takes place by polyaddition with formation of a network of polyurethane or polyurea. After mixing of the two components, 2-component systems have a limited processing time (stand time, pot life), as the reaction that sets in leads to a gradual viscosity increase and finally to gelling of the system. However, many factors determine the effective duration of its processability: reactivity of the reaction partners, catalysis, concentration, solubility, moisture content, NCO/OH ratio and ambient temperature are the most important [Lackharze, Stoye/Freitag, Hauser-Verlag 1996, pages 210/212]. The disadvantage of the prepregs based on such 2-C PUR systems is that only a short time is available for the processing of the prepreg into a composite. Consequently such prepregs are not stable over several hours, let alone days.

Below there follows a description of the polyurethane prepregs or composites based on 2-C PUR systems. In the article by K. Recker, the development of a 2-C polyurethane system for the resin mat process with particular reference to the processing properties for SMC components is reported. (Baypreg—a novel POLYURETHANE material for the resin mat process, Recker, Klaus, Kunststoffe-Plastics 8, 1981).

WO 2005/049301 discloses a catalytically activated 2-C PUR system, wherein the poly-isocyanate component and the polyol are mixed and processed into a composite by pultrusion.

In WO 2005/106155, fibre reinforced composites for the construction industry are disclosed, which are produced by the long fibre injection (LFI) technology with 2-C polyurethane systems.

In JP 2004196851, composites are described which are produced from carbon fibres and organic fibres, such as for example hemp, with the use of a matrix of 2-C PUR based on polymeric methylenediphenyl diisocyanate (MDI) and specific OH group-containing compounds.

EP 1 319 503 describes polyurethane composites wherein special polyurethane covering layers for a fibre laminate impregnated with a 2-C PUR resin, which coats a core layer (e.g. a paper honeycomb) are used. The 2-C PUR resin for example consists of MDI and a mixture of polypropylene triols and diols from ethylene oxide propylene oxide copolymers.

In WO 2003/101719, polyurethane-based composites and the methods of production are described. These are 2-C polyurethane resins with defined viscosities and specific gel times.

2-C PUR systems are also discussed in: "Fiber reinforced polyurethane composites: shock tolerant components with particular emphasis on armor plating" (Ratcliffe, Colin P.; Crane, Roger M.; Santiago, Armando L., AMD (1995), 211 (Innovative Processing and Characterization of Composite Materials), 29-37.) and in Fiber-reinforced polyurethane composites. I. Process feasibility and morphology. (Ma, Chen Chi M.; Chen, Chin Hsing. International SAMPE Symposium and Exhibition (1992), 37 (Mater. Work. You 21st Century), 1062-74.)

Apart from the different binder basis, moisture-curing lacquers largely correspond to analogous 2-C systems both in their composition and also in their properties. In principle, the same solvents, pigments, fillers and auxiliary substances are used. Unlike 2-C lacquers, for stability reasons these systems tolerate no moisture whatsoever before their application.

Also known are physically drying systems based on non-reactive PUR elastomers. These are high molecular weight, linear, thermoplastic urethanes from diols and diisocyanates, preferably MDI, TDI, HDI and IPDI. Such thermoplastic systems as a rule exhibit very high viscosities and hence also very high processing temperatures. This critically hinders their use for prepregs. In the production of prepregs with fibre composites, the use of powders in reactive systems is more unusual and until now has been limited to a few use fields. Probably the most common process for applying a powder onto a fibre surface is the fluidized bed process (fluidized bed impregnation). By means of an upwardly directed flow, powder particles are converted to a state wherein they exhibit fluid-like properties. This process is used in EP 590 702. In this, the strands of individual fibre bundles are floated apart and coated with the powder in the fluidized bed. The powder here consists of a mixture of reactive and thermoplastic powder, in order thus to optimize the properties of the matrix. Finally, individual rovings (fibre bundles) are laid together and several layers compressed under a pressure of 16 bar for about 20 minutes. The temperatures vary between 250 and 350° C. However, in the fluidized bed process irregular coating often occurs, in particular if the strands are not pulled apart.

Concerning this, in US 20040231598 a method is proposed which functions similarly to the fluidized bed process. In this, an air flow transports the particles to the substrate and a uniform deposition of the powder is effected through a specific configuration.

A further process is described in US 20050215148. There uniform distributions of the powder on the fibres are achieved with the device just mentioned. In this, the particle size ranges from 1 to 2000 µm. In several experiments, coating is effected from one or from two sides. Through the uniform application of the powder, laminates with no air inclusions are obtained after subsequent compression of the prepreg.

A further application, WO 2006/043019, describes the use of epoxy and amino-terminated resins in powder form. In this, the powders are mixed and applied onto the fibres. Next, the particles are sintered on. The particle size lies between 1 and 3000 µm, but preferably between 1 and 150 µm.

This restriction of the particle size to rather small diameters is also recommended in a study by the Michigan State University. The theory here is that particles with small diameters will more likely be able to penetrate into cavities between individual filaments than particles with larger diameters (S. Padaki, L. T. Drzal: a simulation study on the effects of particle size on the consolidation of polymer powder impregnated tapes, Department of Chemical Engineering, Michigan State University, Composites: Part A (1999), pp. 325-337).

Apart from the prepreg technology, reactive powder systems are also used in other standard processes, for example in winding technology [M. N. Ghasemi Nejhad, K. M. Ikeda: Design, manufacture and characterization of composites using on-line recycled thermoplastic powder impregnation of fibres and in-situ filament winding, Department of Mechanical Engineering, University of Hawaii at Manoa, Journal of Thermoplastic Composite Materials, Vol 11, pp. 533-572, November 1998] or in the pultrusion process. For the pultrusion process for example fibre strands (towpregs) are coated with the powder and firstly wound and stored as so-called towpregs. One possibility for their production is described in an article in the SAMPE Journal [R. E. Allred, S. P. Wesson, D. A. Babow: powder impregnation studies for high temperature towpregs, Adherent Technologies, SAMPE Journal, Vol. 40, No. 6, pp. 40-48, November/December 2004]. In a further study, such towpregs were pressed together by the pultrusion process and cured to give material components [N. C. Parasnis, K. Ramani, H. M. Borgaonkar: Ribbonizing of electrostatic powder spray impregnated thermoplastic tows by pultrusion, School of Mechanical Engineering, Purdue University, Composites, Part A, Applied science and manufacturing, Vol. 27, pp. 567-574, 1996]. Although the production of towpregs and subsequent compression in the pultrusion process had already been performed with duroplastic systems, to a large extent only thermoplastic systems have until now been used in this process.

In DE 102009001793.3 and DE 102009001806.9, a process is described for the production of storage-stable prepregs, essentially made up of A) at least one fibrous support and B) at least one reactive polyurethane composition in powder form as the matrix material.

The objective was to find a simpler process for the production of simple to handle, that is non-toxic, polyurethane-based prepreg systems based on polyurethane compositions. A further objective of this invention was to find prepregs with polyurethane matrix material which can be produced by a simple process, wherein the main emphasis should be placed on the handling and storage life of the prepregs.

For the production of the prepregs it would be advantageous if the viscosity of formulations of the noncrosslinked matrix materials is low enough to ensure wetting of the fibrous support with sufficient fibre volume content during the production of the composite component, during which thixotropy can also be advantageous, so that run-off of the resin in vertical component segments can be prevented.

Through the choice of suitable starting materials for production of the matrix materials, a sufficiently long processing time (depending on the particular application in the production of the composites) between the melting of the not completely reacted matrix material and the completion of the reaction should be ensured.

Surprisingly, it has now been found that it is possible to produce adequately impregnated, reactive and storage-stable prepregs by first dissolving the individual components in an identical suitable solvent (C), saturating/impregnating the fibrous support with this solution, and then, at low temperature (<100° C.) completely removing the solvent (by, for example, thermal treatment or application of vacuum). Prepregs are thus obtained with at least the same or even improved processing properties as those described in DE 102009001793 or DE 102009001806, which can be used for the production of high performance composites for various applications in the sector of the construction, automobile, aerospace industry, energy technology (wind power plants) and in boat and ship-building. The reactive polyurethane compositions usable according to the invention are environmentally harmless, low cost, exhibit good mechanical properties, are easy to process and after curing are characterized by good weather resistance and a balanced relationship between rigidity and flexibility.

The subject matter of the invention is a process for the production of prepregs essentially made up of A) at least one fibrous support
and
B) at least one reactive polyurethane composition as matrix material,
wherein the polyurethane compositions essentially contain mixtures of a polymer b) having functional groups reactive towards isocyanates as binder and di- or polyisocyanates internally blocked and/or blocked with blocking agents as curing agents a), in at least one solvent (C),
I. by production of the reactive polyurethane composition B) in at least one solvent (C), and
II. direct impregnation of the fibrous support A) with the solution from B),
III. removal of the solvent.

The principle of the process for the production of prepregs consists in that firstly a solution of the reactive polyurethane composition B) is produced from the individual components thereof in an identical suitable solvent (C). This solution of the reactive polyurethane composition B) is then directly applied onto the fibrous support A), whereupon this solution saturates/impregnates the fibrous support. The solvent is then removed. It is preferable that the solvent is completely removed at low temperature, preferably <100° C., via, for example, thermal treatment or application of vacuum. The storable prepregs in turn freed from the solvent can then be further processed at the subsequent juncture to give composites. Through the process according to the invention, a very good impregnation of the fibrous support takes place, due to the fact that the solutions of the reactive polyurethane compositions wet the fibres of the support very well, as a result of which the thermal stress to the polyurethane composition due to prior melt homogenization capable of resulting in an incipient crosslinking reaction is avoided, furthermore the process steps of milling and screening into individual particle size fractions become unnecessary, so that a higher yield of impregnated fibrous support is attained.

The production of the solution of the polyurethane composition B) for the production of the prepregs can be effected in suitable units, such as for example heatable stirred kettles, kneaders or even extruders, during which upper temperature limits of 100° C. should not be exceeded.

In contrast to DE 102009001793.3 and DE 102009001806.9, according to the invention the solutions are brought together with the fibrous support and further processed into prepregs with the desired fibre volume content.

The production of the prepregs by the solution impregnation process according to the invention can in principle be effected by any methods and by means of the known plant and equipment.

Solution impregnation is used, inter alia, for the production of epoxy composites ["Composites Technologien, Paolo Ermanni (Version 4), Script for Lecture ETH Zürich, August 2007, Chapter 4.2.2"]. However, dissolved reactive polyurethane compositions are not mentioned there.

The high temperatures needed at least briefly during the melt impregnation process or during the incipient sintering of pulverulent reactive polyurethane compositions are not required in this process according to the invention. Any thermal stress on the reactive polyurethane compositions will occur only after the impregnation process during the removal of the solvent (C) used, and an upper temperature limit of 120° C. is used, preferably temperatures of from 80 to 100° C. should not be exceeded here, in order to inhibit any incipient reaction of the reactive matrix material.

The prepregs thus produced can be combined into different forms and cut to size as required.

For the consolidation of the prepregs into a single composite and for the crosslinking of the matrix material into the matrix, the prepregs are cut to size, if necessary sewn together or otherwise fixed and compressed in a suitable mould under pressure and if necessary application of vacuum. In the context of this invention, this process of the production of the composites from the prepregs is effected, depending on the curing time, at temperatures of above about 160° C. with the use of reactive matrix materials (modification I), or at temperatures of over 100° C. with highly reactive matrix materials provided with appropriate catalysts (modification II).

After cooling to room temperature, the prepregs produced according to the invention exhibit very high storage stability at room temperature, provided that the matrix material has a Tg of at least 40° C. Depending on the reactive polyurethane composition contained, this is at least several days at room temperature, but as a rule the prepregs are storage-stable for several weeks at 40° C. and below. The prepregs thus produced are not sticky and are thus very easy to handle and to process further. Hence the reactive or highly reactive polyurethane compositions used according to the invention exhibit very good adhesion and distribution on the fibrous support.

During the further processing of the prepregs to composites (composite materials) e.g. by compression at elevated temperatures, very good impregnation of the fibrous support takes place owing to the fact that the then liquid low viscosity reactive or highly reactive polyurethane compositions wet the fibres of the support very well before the crosslinking reaction, before a gelling occurs or the complete polyurethane matrix cures throughout due to the crosslinking reaction of the reactive or highly reactive polyurethane composition at elevated temperatures.

Depending on the composition of the reactive or highly reactive polyurethane composition used and catalysts that may have been added, both the rate of the crosslinking reaction in the production of the composite components and also the properties of the matrix can be varied over wide ranges.

In the context of the invention, the reactive or highly reactive polyurethane composition used for the production of the prepregs is defined as matrix material and in the description of the prepregs the still reactive or highly reactive polyurethane composition applied onto the fibres by the process according to the invention.

The matrix is defined as the matrix materials from the reactive or highly reactive polyurethane compositions crosslinked in the composite.

Support

The fibrous support in the present invention consists of fibrous material (also often referred to as reinforcing fibres). In general any material of which the fibres consist is suitable, however fibrous material of glass, carbon, plastics, such as for example polyamide (aramid) or polyester, natural fibres or mineral fibre materials such as basalt fibres or ceramic fibres (oxide fibres based on aluminium oxides and/or silicon oxides) is preferably used. Mixtures of fibre types, such as for example fabric combinations of aramid- and glass fibres, or carbon and glass fibres, can also be used. Likewise, hybrid composite components can be produced with prepregs from different fibrous supports.

Glass fibres are the most commonly used fibre types mainly owing to their relatively low price. In principle here, all types of glass-based reinforcing fibres are suitable (E glass, S glass, R glass, M glass, C glass, ECR glass, D glass, AR glass, or hollow glass fibres). Carbon fibres are generally used in high performance composite materials where the lower density with at the same time higher strength compared to glass fibres is also an important factor. Carbon fibres (also carbon fibres) are industrially produced fibres from carbon-containing starting materials which are converted by pyrolysis to carbon in graphite-like configuration. A distinction is made between isotropic and anisotropic types: isotropic fibres have only low strength values and lower industrial significance, anisotropic fibres exhibit high strength and rigidity values with at the same time low elongation at break.

Here, all textile fibres and fibre materials which are obtained from plant and animal material (e.g. wood, cellulose, cotton, hemp, jute, flax, sisal or bamboo fibres) are described as natural fibres. Aramid fibres, similarly also to carbon fibres, have a negative coefficient of thermal expansion, i.e. become shorter on heating. Their specific strength and their modulus of elasticity is markedly lower than that of carbon fibres. In combination with the positive coefficient of expansion of the matrix resin, highly dimensionally stable components can be manufactured. Compared to carbon fibre reinforced plastics, the pressure resistance of aramid fibre composite materials is markedly lower. Well-known brand names for aramid fibres are Nomex® and Kevlar® from DuPont, or Teijinconex®, Twaron® and Technora® from Teijin. Supports made of glass fibres, carbon fibres, aramid fibres or ceramic fibres are particularly suitable. The fibrous material is a planar textile body. Planar textile bodies of non-woven material, likewise so-called knitted goods, such as hosiery and knitted fabrics, but also non-knitted skein such as fabric, non-woven or netting, are suitable. In addition, a distinction is made between long fibre and short fibre materials as supports. Also suitable according to the invention are rovings and yarns. All the said materials are suitable as fibrous supports in the context of the invention. An overview of reinforcing fibres is contained in "Composites Technologien, Paolo Ermanni (Version 4), Script for Lecture ETH Zürich, August 2007, Chapter 7".

Matrix Material

In principle, all reactive polyurethane compositions, even those other than those storage-stable at room temperature, are suitable as matrix materials. According to the invention, suitable polyurethane compositions consist of mixtures of a polymer b) having functional groups—reactive towards NCO groups—(binder), also referred to as resin, and di- or polyisocyanates temporarily deactivated, in other words internally blocked and/or blocked with blocking agents, also described as curing agent a) (component a)).

As functional groups of the polymers b) (binder), hydroxyl groups, amino groups and thiol groups which react with the free isocyanate groups by addition and thus crosslink and cure the polyurethane composition are suitable. The binder components must be of solid resin nature (glass temperature greater than room temperature). Possible binders are polyesters, polyethers, polyacrylates, polycarbonates and polyurethanes with an OH number of 20 to 500 mg KOH/gram and an average molecular weight of 250 to 6000 g/mol. Hydroxyl group-containing polyesters or polyacrylates with an OH number of 20 to 150 mg KOH/gram and an average molecular weight of 500 to 6000 g/mol are particularly preferred. Of course mixtures of such polymers can also be used. The quantity of the polymers b) having functional groups is selected such that for each functional group of the component b) 0.6 to 2 NCO equivalents or 0.3 to 1 uretdione group of the component a) are consumed.

As the curing component a), di- and polyisocyanates blocked with blocking agents or internally blocked (uretdione) are used.

The di- and polyisocyanate used according to the invention can consist of any aromatic, aliphatic, cycloaliphatic and/or (cyclo)aliphatic di- and/or polyisocyanates.

As aromatic di- or polyisocyanates, in principle all known aromatic compounds are suitable. 1,3- and 1,4-phenylene diisocyanate, 1,5-naphthylene diisocyanate, tolidine diisocyanate, 2,6-toluoylene diisocyanate, 2,4-toluoylene diisocyanate (2,4-TDI), 2,4'-diphenylmethane diisocyanate (2,4'-MDI), 4,4'-diphenylmethane diisocyanate, the mixtures of monomeric diphenylmethane diisocyanates (MDI) and oligomeric diphenylmethane diisocyanates (polymer MDI), xylylene diisocyanate, tetramethylxylylene diisocyanate and triisocyanato-toluene are particularly suitable.

Suitable aliphatic di- or polyisocyanates advantageously have 3 to 16 carbon atoms, preferably 4 to 12 carbon atoms, in the linear or branched alkylene residue and suitable cycloaliphatic or (cyclo)aliphatic diisocyanates advantageously have 4 to 18 carbon atoms, preferably 6 to 15 carbon atoms, in the cycloalkylene residue. Those skilled in the art adequately understand (cyclo)aliphatic diisocyanates simultaneously to mean cyclically and aliphatically bound NCO groups, such as is for example the case with isophorone diisocyanate. In contrast to this, cycloaliphatic diisocyanates are understood to mean those which only have NCO groups directly bound to the cycloaliphatic ring, e.g. $H_{12}$MDI. Examples are cyclohexane diisocyanate, methylcyclohexane diisocyanate, ethylcyclohexane diisocyanate, propylcyclohexane diisocyanate, methyldiethylcyclohexane diisocyanate, propane diisocyanate, butane diisocyanate, pentane diisocyanate, hexane diisocyanate, heptane diisocyanate, octane diisocyanate, nonane diisocyanate, nonane triisocyanate, such as 4-isocyanatomethyl-1,8-octane diisocyanate (TIN), decane di- and triisocyanate, undecane di- and triisocyanate and dodecane di- and triisocyanate.

Isophorone diisocyanate (IPDI), hexamethylene diisocyanate (HDI), diisocyanato-dicyclohexylmethane ($H_{12}$MDI), 2-methylpentane diisocyanate (MPDI), 2,2,4-trimethylhexamethylene diisocyanate/2,4,4-trimethylhexamethylene diisocyanate (TMDI), and norbornane diisocyanate (NBDI) are preferred. IPDI, HDI, TMDI and $H_{12}$MDI are quite particularly preferably used, the isocyanurates also being usable. Also suitable are 4-methyl-cyclohexane 1,3-diisocyanate, 2-butyl-2-ethylpentamethylene diisocyanate, 3(4)-isocyanatomethyl-1-methylcyclohexyl isocyanate, 2-isocyanatopropyl-cyclohexyl isocyanate, 2,4'-methylenebis(cyclohexyl)diisocyanate and 1,4-diisocyanato-4-methyl-pentane.

Of course, mixtures of the di- and polyisocyanates can also be used.

Furthermore, oligo- or polyisocyanate which can be produced from the said di- or poly-isocyanates or mixtures thereof by linkage by means of urethane, allophanate, urea, biuret, uretdione, amide, isocyanurate, carbodiimide, uretonimine, oxadiazinetrione or iminooxadiazinedione structures are preferably used. Isocyanurate, in particular from IPDI and HDI, are particularly suitable.

The polyisocyanates used according to the invention are blocked. Possible for this are external blocking agents such as for example ethyl acetoacetate, diisopropylamine, methyl ethyl ketoxime, diethyl malonate, ε-caprolactam, 1,2,4-triazole, phenol or substituted phenols and 3,5-dimethylpyrazole.

The curing components preferably used are IPDI adducts which contain isocyanurate groupings and ε-caprolactam blocked isocyanate structures.

Internal blocking is also possible and this is preferably used. The internal blocking is effected via dimer formation via uretdione structures which at elevated temperature again cleave back into the isocyanate structures originally present and hence set the crosslinking with the binder in motion.

Optionally, the reactive polyurethane compositions can contain additional catalysts. These are organometallic catalysts, such as for example dibutyltin dilaurate (DBTL), tin octoate, bismuth neodecanoate, or else tertiary amines, such as for example 1,4-diazabicyclo[2.2.2]-octane, in quantities of 0.001-1 wt. %. These reactive polyurethane compositions used according to the invention are cured under normal conditions, e.g. with DBTL catalysis, from 160° C., usually from ca. 180° C. and as indicated.

For the production of the reactive polyurethane compositions, the additives usual in coating powder technology, such as levelling agents, e.g. polysilicones or acrylates, light screening agents, e.g. sterically hindered amines, or other auxiliary substances such as were for example described in EP 669 353, can be added in a total quantity of 0.05 to 5 wt. %. Fillers and pigments such as for example titanium dioxide can be added in a quantity up to 30 wt. % of the total composition.

In the context of this invention reactive (modification I) means that the reactive polyurethane compositions used according to the invention cure as described above at temperatures from 160° C., this depending on the nature of the support.

The reactive polyurethane compositions used according to the invention are cured under normal conditions, e.g. with DBTL catalysis, from 160° C., usually from ca. 180° C. The time for the curing of the polyurethane composition used according to the invention is as a rule within 5 to 60 minutes.

Preferably used in the present invention is a matrix material B), from a polyurethane composition B) containing reactive uretdione groups, essentially containing
    a) at least one curing agent containing uretdione groups, based on polyaddition compounds from polyisocyanates containing aliphatic, (cyclo)aliphatic or cycloaliphatic uretdione groups and hydroxyl group-containing compounds, where the curing agent exists in solid form below 40° C. and in liquid form above 125° C. and has a free NCO content of less than 5 wt. % and a uretdione content of 3-25 wt. %,
    b) at least one hydroxyl group-containing polymer which exists in solid form below 40° C. and in liquid form above 125° C. and has an OH number between 20 and 200 mg KOH/gram,
    c) optionally at least one catalyst,
    d) optionally auxiliary agents and additives known from polyurethane chemistry,
so that the two components a) and b) are present in the ratio that for every hydroxyl group of the component b) 0.3 to 1 uretdione group of the component a) is consumed, preferably 0.45 to 0.55. The latter corresponds to an NCO/OH ratio of 0.9 to 1.1 to 1.

Polyisocyanates containing uretdione groups are well known and are for example described in U.S. Pat. Nos. 4,476,054, 4,912,210, 4,929,724 and EP 417 603. A comprehensive overview of industrially relevant processes for the dimerization of isocyanates to uretdiones is provided by J. Prakt. Chem. 336 (1994) 185-200. In general, the conversion of isocyanates to uretdiones is effected in the presence of soluble dimerization catalysts such as for example dialkylaminopyridines, trialkylphosphines, phosphorous acid triamides or imidazoles. The reaction—optionally performed in solvents, but preferably in the absence of solvents—is stopped by addition of catalyst poisons on attainment of a desired conversion level. Excess monomeric isocyanate is then removed by flash evaporation. If the catalyst is sufficiently volatile, the reaction mixture can be freed from catalyst in the course of the monomer separation. The addition of catalyst poisons can in this case be omitted. Essentially, a broad palette of isocyanates is suitable for the production of polyisocyanates containing uretdione groups. The aforesaid di- and polyisocyanate can be used. However di- and polyisocyanates from any aliphatic, cycloaliphatic and/or (cyclo)aliphatic di- and/or polyisocyanates are preferred. According to the invention, isophorone diisocyanate (IPDI), hexamethylene diisocyanate (HDI), diisocyanatodicyclohexylmethane ($H_{12}$MDI), 2-methylpentane diisocyanate (MPDI), 2,2,4-trimethylhexamethylene diisocyanate/2,4,4-trimethylhexa-methylene diisocyanate (TMDI) or norbornane diisocyanate (NBDI) are used. Quite especially preferably, IPDI, HDI, TMDI and $H_{12}$MDI are used, and the isocyanurates can also be used.

Quite especially preferably, IPDI and HDI are used for the matrix material. The conversion of these polyisocyanates containing uretdione groups to curing agents a) containing uretdione groups comprises the reaction of the free NCO groups with hydroxyl group-containing monomers or polymers, such as for example polyesters, polythioethers, polyethers, polycaprolactams, polyepoxides, polyester amides, polyurethanes or lower molecular weight di, tri- and/or tetrahydric alcohols as chain extenders and optionally monoamines and/or monohydric alcohols as chain terminators and has already often been described (EP 669 353, EP 669 354, DE 30 30 572, EP 639 598 or EP 803 524).

Preferred curing agents a) having uretdione groups have a free NCO content of less than 5 wt. % and a content of uretdione groups of 3 to 25 wt. %, preferably 6 to 18 wt. % (calculated as $C_2N_2O_2$, molecular weight 84). Polyesters and monomeric dihydric alcohols are preferred. Apart from the uretdione groups the curing agents can also exhibit isocyanurate, biuret, allophanate, urethane and/or urea structures.

In the case of the hydroxyl group-containing polymers b), polyesters, polyethers, polyacrylates, polyurethanes and/or polycarbonates with an OH number of 20-200 in mg KOH/gram are preferably used. Particularly preferably, polyesters with an OH number of 30-150, an average molecular weight of 500-6000 g/mol which exist in solid form below 40° C. and in liquid form above 125° C. are used. Such binders have for example been described in EP 669 354 and EP 254 152. Of course, mixtures of such polymers can also be used. The quantity of the hydroxyl group-containing polymers b) is selected such that for every hydroxyl group of the component b) 0.3 to 1 uretdione group of the component a), preferably 0.45 to 0.55, is consumed. Optionally, additional catalysts c) can also be contained in the reactive polyurethane compositions B) according to the invention. These are organometallic catalysts, such as for example dibutyl tin dilaurate, zinc octoate, bismuth neodecanoate, or else tertiary amines, such as for example 1,4-diazabicyclo[2.2.2] octane, in quantities of 0.001-1 wt. %. These reactive polyurethane compositions used according to the invention are cured under normal conditions, e.g. with DBTL catalysis, from 160° C., usually from ca. 180° C. and referred to as modification I.

For the production of the reactive polyurethane compositions according to the invention, the additives d) usual in coating powder technology, such as levelling agents, e.g. polysilicones or acrylates, light screening agents, e.g. sterically hindered amines, or other additives such as were for example described in EP 669 353, can be added in a total quantity of 0.05 to 5 wt. %. Fillers and pigments such as for example titanium dioxide can be added in a quantity up to 30 wt. % of the total composition.

The reactive polyurethane compositions used according to the invention are cured under normal conditions, e.g. with DBTL catalysis, from 160° C., usually from ca. 180° C. The reactive polyurethane compositions used according to the invention provide very good flow and hence good impregnation behaviour and in the cured state excellent chemicals resistance. In addition, with the use of aliphatic crosslinking agents (e.g. IPDI or $H_{12}$MDI) good weather resistance is also achieved.

Particularly preferably in the invention a matrix material is used which is made from B) at least one polyurethane composition containing highly reactive uretdione groups, essentially containing
   a) at least one curing agent containing uretdione groups and
   b) optionally at least one polymer with functional groups reactive towards NCO groups;
   c) 0.1 to 5 wt. % of at least one catalyst selected from quaternary ammonium salts and/or quaternary phosphonium salts with halogens, hydroxides, alcoholates or organic or inorganic acid anions as the counter-ion; and
   d) 0.1 to 5 wt. % of at least one cocatalyst, selected from
     d1) at least one epoxide
     and/or
     d2) at least one metal acetylacetonate and/or quaternary ammonium acetylacetonate and/or quaternary phosphonium acetylacetonate;
   e) optionally auxiliary substances and additives known from polyurethane chemistry.

Quite especially, a matrix material B) made from

B) at least one highly reactive powdery polyurethane composition containing uretdione groups as matrix material, essentially containing
   a) at least one curing agent containing uretdione groups, based on polyaddition compounds from aliphatic, (cyclo)aliphatic or cycloaliphatic polyisocyanates containing uretdione groups and hydroxyl group-containing compounds, where the curing agent exists in solid form below 40° C. and in liquid form above 125° C. and has a free NCO content of less than 5 wt. % and a uretdione content of 3-25 wt. %,
   b) at least one hydroxyl group-containing polymer which exists in solid form below 40° C. and in liquid form above 125° C. and has an OH number between 20 and 200 mg KOH/gram;
   c) 0.1 to 5 wt. % of at least one catalyst selected from quaternary ammonium salts and/or quaternary phosphonium salts with halogens, hydroxides, alcoholates or organic or inorganic acid anions as the counter-ion; and
   d) 0.1 to 5 wt. % of at least one cocatalyst, selected from
     d1) at least one epoxide
     and/or
     d2) at least one metal acetylacetonate and/or quaternary ammonium acetylacetonate and/or quaternary phosphonium acetylacetonate;
   e) optionally auxiliary substances and additives known from polyurethane chemistry, is used so that the two components a) and b) are present in the ratio such that for every hydroxyl group of the component b) 0.3 to 1 uretdione group of the component a) is consumed, preferably 0.6 to 0.9. The latter corresponds to an NCO/OH ratio of 0.6 to 2 to 1 or 1.2 to 1.8 to 1. These highly reactive polyurethane compositions used according to the invention are cured at temperatures of 100 to 160° C. and are referred to as modification II.

Suitable polyurethane compositions containing highly reactive uretdione groups according to the invention contain mixtures of temporarily deactivated, i.e. uretdione group-containing (internally blocked) di- or polyisocyanates, also referred to as curing agents a) and the catalysts c) and d) contained according to the invention and optionally in addition a polymer (binder) having functional groups reactive towards NCO groups, also referred to as resin b). The catalysts ensure curing of the polyurethane compositions containing uretdione groups at low temperature. The polyurethane compositions containing uretdione groups are thus highly reactive.

As component a) and b), those such as described above are used.

As catalysts under c), quaternary ammonium salts, tetralkylammonium salts and/or quaternary phosphonium salts with halogens, hydroxides, alcoholates or organic or inorganic acid anions as the counter-ion, are preferably used. Examples of these are: tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and tetrabutyl-ammonium benzoate and tetrabutylphosphonium acetate, tetrabutylphosphonium formate and ethyltriphenylphosphonium acetate, tetrabutylphosphonium benzotriazolate, tetraphenyl-phosphonium phenolate and trihexyltetradecylphosphonium decanoate, methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctyl-ammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethyl-ammonium hydroxide, trimethylvinylammonium hydroxide, methyltributylammonium methanolate, methyltriethylammonium methanolate, tetramethylammonium methanolate, tetraethylammonium methanolate, tetrapropylammonium methanolate, tetrabutylammonium methanolate, tetrapentylammonium methanolate, tetrahexylammonium methanolate, tetraoctylammonium methanolate, tetradecylammonium methanolate, tetradecyltrihexylammonium methanolate, tetraoctadecylammonium methanolate, benzyltrimethylammonium methanolate, benzyltriethylammonium methanolate, trimethylphenylammonium methanolate, triethylmethylammonium methanolate, trimethylvinylammonium methanolate, methyltributyl-ammonium ethanolate, methyltriethylammonium ethanolate, tetramethylammonium ethanolate, tetraethylammonium ethanolate, tetrapropylammonium ethanolate, tetrabutyl-ammonium ethanolate, tetrapentylammonium ethanolate, tetrahexylammonium ethanolate, tetraoctylammonium ethanolate, tetradecylammonium ethanolate, tetradecyltrihexylammonium ethanolate, tetraoctadecylammonium ethanolate, benzyltrimethylammonium ethanolate, benzyltriethylammonium ethanolate, trimethylphenylammonium ethanolate, triethylmethylammonium ethanolate, trimethylvinylammonium ethanolate, methyltributyl-ammonium benzylate, methyltriethylammonium benzylate, tetramethylammonium benzylate, tetraethylammonium benzylate, tetrapropylammonium benzylate, tetrabutylammonium benzylate, tetrapentylammonium benzylate, tetrahexylammonium benzylate, tetraoctyl-ammonium benzylate, tetradecylammonium benzylate, tetradecyltrihexylammonium benzylate, tetraoctadecylammonium benzylate, benzyltrimethylammonium benzylate, benzyltriethylammonium benzylate, trimethylphenylammonium benzylate, triethylmethyl-ammonium benzylate, trimethylvinylammonium benzylate, tetramethylammonium fluoride, tetraethylammonium fluoride, tetrabutylammonium fluoride, tetraoctylammonium fluoride, benzyltrimethylammonium fluoride, tetrabutylphosphonium hydroxide, tetrabutylphosphonium fluoride, tetrabutylammonium chloride, tetrabutylammonium bromide, tetrabutylammonium iodide, tetraethylammonium chloride, tetraethylammonium bromide, tetraethylammonium iodide, tetramethylammonium chloride, tetramethylammonium bromide, tetramethyl-ammonium iodide, benzyltrimethylammonium chloride, benzyltriethylammonium chloride, benzyltripropylammonium chloride, benzyltributylammonium chloride, methyltributylammonium chloride, methyltripropylammonium chloride, methyltriethylammonium chloride, methyltriphenylammonium chloride, phenyltrimethylammonium chloride, benzyltrimethyl-ammonium bromide, benzyltriethylammonium bromide, benzyltripropylammonium bromide, benzyltributylammonium bromide, methyltributylammonium bromide, methyltripropyl-ammonium bromide, methyltriethylammonium bromide, methyltriphenylammonium bromide, phenyltrimethylammonium bromide, benzyltrimethylammonium iodide, benzyltriethylammonium iodide, benzyltripropylammonium iodide, benzyltributylammonium iodide, methyltributylammonium iodide, methyltripropylammonium iodide, methyltriethylammonium iodide, methyltriphenylammonium iodide and phenyltrimethylammonium iodide, methyltributylammonium hydroxide, methyltriethylammonium hydroxide, tetramethylammonium hydroxide, tetraethylammonium hydroxide, tetrapropylammonium hydroxide, tetrabutyl-ammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethyl-ammonium hydroxide, trimethylvinylammonium hydroxide, tetramethylammonium fluoride, tetraethylammonium fluoride, tetrabutylammonium fluoride, tetraoctylammonium fluoride and benzyltrimethylammonium fluoride. These catalysts can be added alone or in mixtures. Preferably tetraethylammonium benzoate and tetrabutylammonium hydroxide are used.

The content of catalysts c) can be from 0.1 to 5 wt. %, preferably from 0.3 to 2 wt. %, based on the whole formulation of the matrix material.

One modification according to the invention modification also includes the binding of such catalysts c) to the functional groups of the polymers b). In addition, these catalysts can be surrounded with an inert shell and thus be encapsulated.

As cocatalysts d1) epoxides are used. Possible here are for example glycidyl ethers and glycidyl esters, aliphatic epoxides, diglycidyl ethers based on bisphenol A and glycidyl methacrylates. Examples of such epoxides are triglycidyl isocyanurate (TGIC, trade name ARALDIT 810, Huntsman), mixtures of diglycidyl terephthalate and triglycidyl trimellitate (trade name ARALDIT PT 910 and 912, Huntsman), glycidyl esters of versatic acid (trade name KARDURA E10, Shell), 3,4-epoxycyclohexylmethyl 3',4'-epoxycyclohexanecarboxylate (ECC), diglycidyl ethers based on bisphenol A (trade name EPIKOTE 828, Shell) ethylhexylglycidyl ether, butylglycidyl ether, pentaerythritol tetraglycidyl ether, (trade name POLYPDX R16, UPPC AG) and other Polypox types with free epoxy groups. Mixtures can also be used. Preferably ARALDIT PT 910 and 912 are used.

As cocatalysts d2) metal acetylacetonates are possible. Examples thereof are zinc acetylacetonate, lithium acetylacetonate and tin acetylacetonate, alone or in mixtures. Preferably zinc acetylacetonate is used.

As cocatalysts d2) quaternary ammonium acetylacetonates or quaternary phosphonium acetylacetonates are also possible.

Examples of such catalysts are tetramethylammonium acetylacetonate, tetraethylammonium acetylacetonate, tetrapropylammonium acetylacetonate, tetrabutylammonium acetyl-acetonate, benzyltrimethylammonium acetylacetonate, benzyltriethylammonium acetyl-acetonate, tetramethylphosphonium acetylacetonate, tetraethylphosphonium acetyl-acetonate, tetrapropylphosphonium acetylacetonate, tetrabutylphosphonium acetylacetonate, benzyltrimethylphosphonium acetylacetonate and benzyltriethylphosphonium acetyl-acetonate. Particularly preferably, tetraethylammonium acetylacetonate and tetrabutyl-ammonium acetylacetonate are used. Mixtures of such catalysts can of course also be used.

The content of cocatalysts d1) and/or d2) can be from 0.1 to 5 wt. %, preferably from 0.3 to 2 wt. %, based on the whole formulation of the matrix material.

By means of the highly reactive and thus low temperature curing polyurethane compositions B) used according to the invention, at 100 to 160° C. curing temperature not only can energy and curing time be saved, but many temperature-sensitive supports can also be used.

In the context of this invention, highly reactive (modification II) means that the polyurethane compositions containing uretdione groups used according to the invention cure at temperatures from 100 to 160° C., depending on the nature of the support. This curing temperature is preferably 120 to 150° C., particularly preferably from 130 to 140° C. The time for the curing of the polyurethane composition used according to the invention lies within from 5 to 60 minutes.

The polyurethane compositions containing highly reactive uretdione groups used according to the invention provide very good flow and hence good impregnation behaviour and in the cured state excellent chemicals resistance. In addition, with the use of aliphatic crosslinking agents (e.g. IPDI or $H_{12}$MDI) good weather resistance is also achieved.

Suitable solvents that can be used for the process according to the invention are any of the aprotic liquids which are not reactive towards the reactive polyurethane compositions, and which have adequate ability to dissolve the individual components used in the reactive polyurethane composition, and which, in the context of the solvent removal process step, can be extracted from the prepreg impregnated with the reactive polyurethane composition to leave only slight traces (<0.5% by weight), and it is advantageous to recycle the solvent removed. Examples that may be mentioned here are: ketones (acetone, methyl ethyl ketone, methyl isobutyl ketone, cyclohexanone), ethers (tetrahydrofuran), esters (n-propyl acetate, n-butyl acetate, isobutyl acetate, propylene 1,2-carbonate, propylene glycol methyl ether acetate).

The fibre volume content of the prepregs produced according to the invention and also of the composite components is greater than 50%, preferably greater than 50-70%, particularly preferably from 50 to 65%.

The reactive or highly reactive polyurethane compositions used according to the invention as matrix material essentially consist of a mixture of a reactive resin and a curing agent. After melt homogenization, this mixture has a Tg of at least 40° C. and as a rule reacts only above 160° C. in the case of the reactive polyurethane compositions, or above 100° C. in the case of the highly reactive polyurethane compositions, to give a crosslinked polyurethane and thus forms the matrix of the composite. This means that the prepregs according to the invention after their production are made up of the support and the applied reactive polyurethane composition as matrix material, which is present in noncrosslinked but reactive form.

The prepregs are thus storage-stable, as a rule for several days and even weeks and can thus at any time be further processed into composites. This is the essential difference from the 2-component systems already described above, which are reactive and not storage-stable, since after application these immediately start to react and crosslink to give polyurethanes.

The process according to the invention can be performed by means of the known plants and equipment by reaction injection moulding (RIM), reinforced reaction injection moulding (RRIM), pultrusion processes, by applying the solution in a cylinder mill or by means of a hot doctor knife, or other processes.

Also subject matter of the invention is the use of the prepregs produced according to in particular with fibrous supports of glass, carbon or aramid fibres.

Also subject matter of the invention is the use of the prepregs produced according to the invention, for the production of composites in boat and shipbuilding, in aerospace technology, in automobile manufacture, and for bicycles, preferably motorcycles and cycles, and in the sectors automotive, construction, medical engineering, sport, electrical and electronics industry, and power generating plants, e.g. for rotor blades in wind power plants.

Also subject matter of the invention are the prepregs produced by the process according to the invention.

Also subject matter of the invention are the composite components produced from the prepregs produced according to the invention.

Below, the invention is illustrated by examples.

EXAMPLES

Glass fibre nonwovens/fabrics used:
The following glass fibre nonwovens/fabrics were used in the examples, glass filament fabric 296 g/m²—Atlas, Finish FK 144 (Interglas 92626)

Reactive Polyurethane Composition
Reactive polyurethane compositions with the following formulae were used for the production of the prepregs and the composites.

| Example 1 | | | |
|---|---|---|---|
| VESTAGON BF-9030 (total NCO: 11.0%) | Hardener component a) containing uretdione groups | 10.84% by wt. | Evonik Degussa |
| Crylcoat 2839-0 (OH number: 54.9 mg KOH/g) | Hydroxy polyester binder b) | 28.98% by wt. | Cytec Industries Inc. |
| Benzoin | Devolatilizing agent | 0.18% by wt. | Aldrich |
| THF/Cyclohexanone (in 40/20 ratio) | Solvent c) | 60.00% by wt. | Fluka |
| Example 2 | | | |
| VESTAGON BF-9030 (total NCO: 11.0%) | Hardener component a) containing uretdione groups | 10.84% by wt. | Evonik Degussa |
| Crylcoat 2839-0 (OH number: 54.9 mg KOH/g) | Hydroxy polyester binder b) | 28.98% by wt. | Cytec Industries Inc. |
| Benzoin | Devolatilizing agent | 0.18% by wt. | Aldrich |
| THF | Solvent c) | 60.00% by wt. | Fluka |

The starting materials in the table are intimately mixed in a premixer and then dissolved in the stated solvent.

To produce the prepreg, the glass fibre fabric is saturated with the solution of the matrix materials. The prepregs are dried to constant weight in an oven at temperatures of from 50 to 70° C., optionally with application of vacuum. The matrix volume content is determined as 34.2% in Example 1 (10 tests) and 33.9% in Example 2 (6 tests). The fibre volume contents are corresponding 65.8% (Example 1) and 66.1% (Example 2).

DSC Measurements

The DSC tests (glass transition temperature determinations and enthalpy of reaction measurements) are performed with a Mettler Toledo DSC 821e as per DIN 53765.

The DSC studies of the prepregs from Examples 1 and 2 gives the following results:

|  | Ex. 1 | Ex. 2 |
|---|---|---|
| Tg (1st heating procedure) in ° C. | 35 | 43 |
| Exothermic peak (1st heating procedure) in ° C. | 199 | 200 |
| Exothermic heat flux (1st heating procedure) in J/g | 18 | 23 |
| Tg (2nd heating procedure) in ° C. | 70 | 71 |

The glass transition temperatures measured during the second heating procedure are the glass transition temperatures of the fully reacted/crosslinked matrix material.

Storage Stability of the Prepregs

Figure 1:
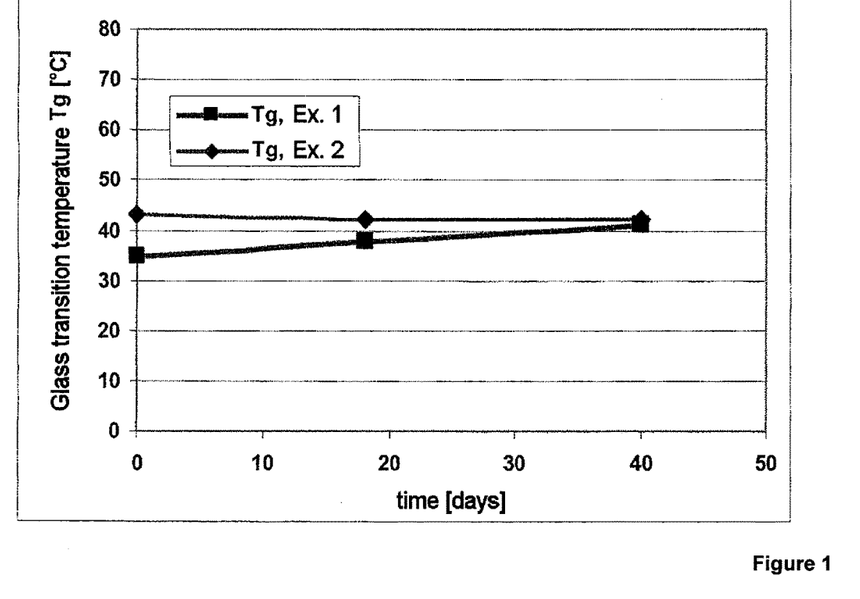
FIG. 1: The glass transition temperatures (Tg) obtained from the DSC study of the prepregs from Examples 1 and 2.
Figure 2:
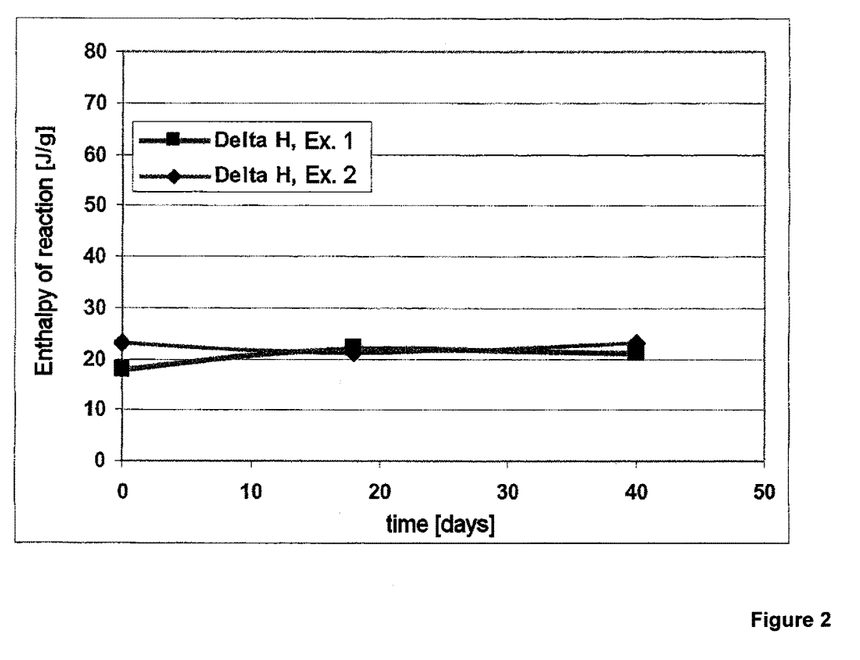
FIG. 2: The enthalpies of reaction (delta H) obtained from the DSC study of the prepregs from Examples 1 and 2.

The DSC studies of the prepregs from Examples 1 and 2 give the following results measured after 18 and, respectively, 40 days, seen in FIGS. 1 and 2. The reaction enthalpies measured do not decrease significantly during the course of storage, and this provides evidence of the reactivity of the matrix material.

Composite Component Production

The composite components are produced on a composite press by a compression technique known to those skilled in the art. The homogeneous prepregs produced by direct impregnation were compressed into composite materials on a benchtop press. This benchtop press is the Polystat 200 T from the firm Schwabenthan, with which the prepregs are compressed to the corresponding composite sheets at temperatures between 120 and 200° C. The pressure is varied between normal pressure and 450 bar. Dynamic compression, i.e. alternating applications of pressure, can prove advantageous for the crosslinking of the fibres depending on the component size, component thickness and polyurethane composition and hence the viscosity setting at the processing temperature.

In one example, the temperature of the press is adjusted to 150° C. and, in the course of compression, increased to 180° C., the pressure is increased to 5 bar after a short melting phase of 3 minutes and held until the removal of the composite component from the press after up to 30 minutes. The hard, rigid, chemicals resistant and impact resistant composite components (sheet products) are tested for the degree of curing (determination by DSC). With the polyurethane composition used, the crosslinking is complete after ca. 20 minutes, and then an enthalpy of reaction for the crosslinking reaction is also no longer detectable.

The invention claimed is:

1. A process of producing a prepreg, the process comprising, in the following order:
   directly impregnating a fibrous support with a solution comprising a reactive polyurethane composition and a solvent, to obtain a prepreg intermediate; and then
   removing the solvent from the prepreg intermediate at a temperature less than 100° C., to obtain a prepreg comprising the fibrous support and a crosslinkable matrix comprising the reactive polyurethane composition and less than 0.5% by weight of the solvent,
   wherein the reactive polyurethane composition comprises (1) a polymer comprising a functional group reactive towards an isocyanate and (2) at least one internally blocked di- or polyisocyanate,
   wherein the polymer comprising a functional group reactive towards an isocyanate functions as a binder and is at least one member selected from the group consisting of polyesters, polyacrylates, and polycarbonates,
   wherein the internally blocked di- or polyisocyanate functions as a curing agent, and
   wherein the matrix in the prepreg is not crosslinked.

2. The process according to claim 1, wherein the matrix has a Tg of at least 40° C.

3. The process according to claim 1, wherein the fibrous support comprises a glass, carbon, plastic, natural fiber, or mineral fiber.

4. The process according to claim 1, wherein the fibrous support is a planar textile body comprising a non-woven material, a knitted good, or a non-knitted skein.

5. The process according to claim 1, wherein the polymer comprises at least one functionality selected from the group consisting of a hydroxyl group, an amino group, and a thiol group.

6. The process according to claim 1, wherein the di- or polyisocyanate is selected from the group consisting of isophorone diisocyanate (IPDI), hexamethylene diisocyanate (HDI), diisocyanatodicyclohexylmethane ($H_{12}$MDI), 2-methylpentane diisocyanate (MPDI), 2,2,4-trimethylhexamethylene diisocyanate, 2,4,4-trimethyl-hexamethylene diisocyanate, norbornane diisocyanate (NBDI), and an isocyanurate.

7. The process according to claim 1, wherein the reactive polyurethane composition further comprises a catalyst in an amount of from 0.001 to 1 wt. %.

8. The process according to claim 1, wherein the fibrous support comprises a fibrous support of a glass, carbon, or aramid fiber.

9. A process of producing a composite, comprising:
   producing a prepreg according to claim 1; and
   crosslinking the matrix,
   wherein the composite is suitable for boat and shipbuilding, aerospace technology, automobile manufacturing, bicycle manufacturing, automotive, construction, or medical engineering technology, sport fields, electrical and electronics industries, or power generation plants.

10. The process according to claim 1, wherein the polymer comprising a functional group reactive towards an isocyanate has an OH number of from 20 to 500 mg KOH/gram and an average molecular weight of from 250 to 6000 g/mol.

11. The process according to claim 1, wherein the polymer comprising a functional group reactive towards an isocyanate is a polyacrylate.

12. The process according to claim 1, wherein the polymer comprising a functional group reactive towards an isocyanate is a polyester.

13. The process according to claim 1, wherein the di- or polyisocyanate is internally blocked with a uretdione.

14. The process according to claim 1, wherein:
   the polymer comprising a functional group reactive towards an isocyanate is a hydroxyl group-containing polymer, wherein the hydroxyl group-containing polymer is a solid below 40° C. and a liquid above 125° C. and has an OH number between 20 and 200 mg KOH/gram,
   the internally blocked di- or polyisocyanate is a polyisocyanate containing uretdione groups, wherein the polyisocyanate containing uretdione groups is a polyaddition compound of an aliphatic, (cyclo)aliphatic, or cycloaliphatic polyisocyanate containing uretdione groups and a hydroxyl group-containing compound, wherein the polyisocyanate containing uretdione groups is solid below 40° C. and a liquid above 125° C., has a free NCO content of less than 5wt. %, and a uretdione content of from 3 to 25 wt. %, the hydroxyl groups of the hydroxyl group containing-containing polymer reacts with the uretdione groups of the polyisocyanate containing uretdione groups and for every hydroxyl group of the hydroxyl group-containing polymer, 0.3 to 1 uretdione groups of the polyisocyanate containing uretdione groups is consumed, and the matrix optionally further comprises at least one component selected from the group consisting of a catalyst, an auxiliary substance, and an additive.

15. The process, according to claim 1, wherein:

the matrix is a highly reactive powdery polyurethane composition comprising uretdione groups, the internally blocked di- or polyisocyanate comprises a uretdione group, the matrix further comprises 0.1 to 5 wt. % of at least one catalyst selected from the group consisting of a quaternary ammonium salt and a quaternary phosphonium salt, wherein the quaternary ammonium salt and the quaternary phosphonium salt comprise a halogen, a hydroxide, an alcoholate, an organic acid anion, or an inorganic acid anion as a counter-ion, the matrix further comprises 0.1 to 5 wt. % of at least one cocatalyst selected from the group consisting of an epoxide, a metal acetylacetonate, a quaternary ammonium acetylacetonate, and a quaternary phosphonium acetylacetonate, and the matrix optionally further comprises an auxiliary substance, an additive, or a mixture thereof.

16. The process according to claim 1, wherein:

the matrix is a highly reactive powdery polyurethane composition comprising uretdione groups, the matrix further comprises 0.1 to 5 wt. % of at least one catalyst selected from the group consisting of a quaternary ammonium salt and a quaternary phosphonium salt, wherein the quaternary ammonium salt and the quaternary phosphonium salt comprise a halogen, a hydroxide, an alcoholate, an organic acid anion, or an inorganic acid anion as a counter-ion, the matrix farther comprises 0.1 to 5 wt. % of at least one cocatalyst selected from the group consisting of an epoxide, a metal acetylacetonate, a quaternary ammonium acetylacetonate, and a quaternary phosphonium acetylacetonate, the polymer comprising a functional group reactive towards an isocyanate is a hydroxyl group-containing polymer, wherein the hydroxyl group-containing polymer is a solid below 40° C. and a liquid above 125° C. and has an OH number between 20 and 200 mg KOH/gram, the internally blocked di- or polyisocyanate is a polyisocyanate containing uretdione groups, wherein the polyisocyanate containing uretdione groups is a polyaddition compound of an aliphatic, (cyclo)aliphatic, or cycloaliphatic polyisocyanate containing uretdione groups and a hydroxyl group-containing compound, wherein the polyisocyanate containing uretdione groups is solid below 40° C. and a liquid above 125° C., has a free NCO content of less than 5wt. %, and a uretdione content of from 3 to 25 wt. %, and the hydroxyl groups of the hydroxyl group containing-containing polymer reacts with the uretdione groups of the polyisocyanate containing uretdione groups and for every hydroxyl group of the hydroxyl group-containing polymer, 0.3 to 1 uretdione groups of the polyisocyanate containing uretdione groups is consumed.

\* \* \* \* \*